US011977680B2

(12) United States Patent
Zhong (10) Patent No.: US 11,977,680 B2
(45) Date of Patent: May 7, 2024

(54) LIGHT AND THIN VIRTUAL REALITY GLOVES AND METHOD FOR MANUFACTURING THE SAME

(71) Applicants: Avary Holding (Shenzhen) Co., Limited., Shenzhen (CN); QING DING PRECISION ELECTRONICS (HUAIAN) CO.,LTD, Huai an (CN)

(72) Inventor: Shi-Jie Zhong, Shenzhen (CN)

(73) Assignees: Avary Holding (Shenzhen) Co., Limited., Shenzhen (CN); QING DING PRECISION ELECTRONICS (HUAIAN) CO., LTD, Huai an (CN)

( * ) Notice: Subject to any disclaimer, the term of this patent is extended or adjusted under 35 U.S.C. 154(b) by 0 days.

(21) Appl. No.: 17/826,662

(22) Filed: May 27, 2022

(65) Prior Publication Data

US 2022/0291745 A1    Sep. 15, 2022

Related U.S. Application Data

(63) Continuation-in-part of application No. PCT/CN2020/085190, filed on Apr. 16, 2020.

(51) Int. Cl.
*G06F 3/01* (2006.01)
(52) U.S. Cl.
CPC .............. *G06F 3/014* (2013.01); *G06F 3/016* (2013.01)

(58) Field of Classification Search
None
See application file for complete search history.

(56) References Cited

U.S. PATENT DOCUMENTS

| 10,642,356 | B1* | 5/2020 | Wang | G06F 3/014 |
| 2020/0142490 | A1* | 5/2020 | Xiong | G06F 3/014 |
| 2020/0257384 | A1* | 8/2020 | Ahne | G06F 3/014 |
| 2021/0386145 | A1* | 12/2021 | Dong | A41D 19/0024 |

FOREIGN PATENT DOCUMENTS

| CN | 109793295 A | 5/2019 |
| CN | 109901708 A | 6/2019 |
| CN | 110313663 A | 10/2019 |
| TW | 201822856 A | 7/2018 |

* cited by examiner

*Primary Examiner* — Andre L Matthews
(74) *Attorney, Agent, or Firm* — ScienBiziP, P.C.

(57) ABSTRACT

A virtual reality glove includes a gloved shaped substrate including a palm area and a finger area connected with the palm area, a plurality of conductive circuits disposed on the glove shaped substrate, a plurality of tactile feedback units disposed on and electrically connected with the plurality of conductive circuits respectively, and a data processing unit installed on an end of the palm area away from the finger area and electrically connected with the plurality of conductive circuits. The glove shaped substrate is flexible, and the conductive circuits are curved. A method for manufacturing the virtual reality glove is also disclosed.

16 Claims, 13 Drawing Sheets

LIGHT AND THIN VIRTUAL REALITY GLOVES AND METHOD FOR MANUFACTURING THE SAME

FIELD

The present disclosure relates to human-computer physical interface, in particular to a virtual reality glove and a method for manufacturing the virtual reality glove.

BACKGROUND

A virtual reality glove is generally a glove that fits over at least a part of a user's hand and detects movement of a user's fingers and/or thumb to simulate or experience action in the virtual reality. A processor, a wireless communication module, and a battery are generally integrated on the back of the virtual reality glove, increasing a volume and a weight.

BRIEF DESCRIPTION OF THE DRAWINGS

The following drawn figures are to be viewed in conjunction with the embodiments described herein.

DETAILED DESCRIPTION

The present disclosure will now be described more fully hereinafter with reference to the accompanying drawings, in which exemplary embodiments of the disclosure are shown. This disclosure may, however, be embodied in many different forms and should not be construed as limited to the exemplary embodiments set forth herein. Rather, these exemplary embodiments are provided so that this disclosure will be thorough and complete, and will fully convey the scope of the disclosure to those skilled in the art. Like reference numerals refer to like elements throughout.

As used herein, when a first component is referred to as "connecting" to a second component, it is intended that the first component may be directly connected to the second component or may be indirectly connected to the second component via a third component between them. When a first component is referred to as "disposed to" a second component, it is intended that the first component may be directly disposed to the second component or may be disposed to the second component via a third component between them. The terms "perpendicular," "horizontal," "left," "right," and similar expressions used herein are merely intended for description.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The term "and/or" used herein includes any suitable combination of one or more related items listed.

FIGS. 1 to 16 illustrate an embodiment of a method for manufacturing a virtual reality glove 100.

Figure 1:
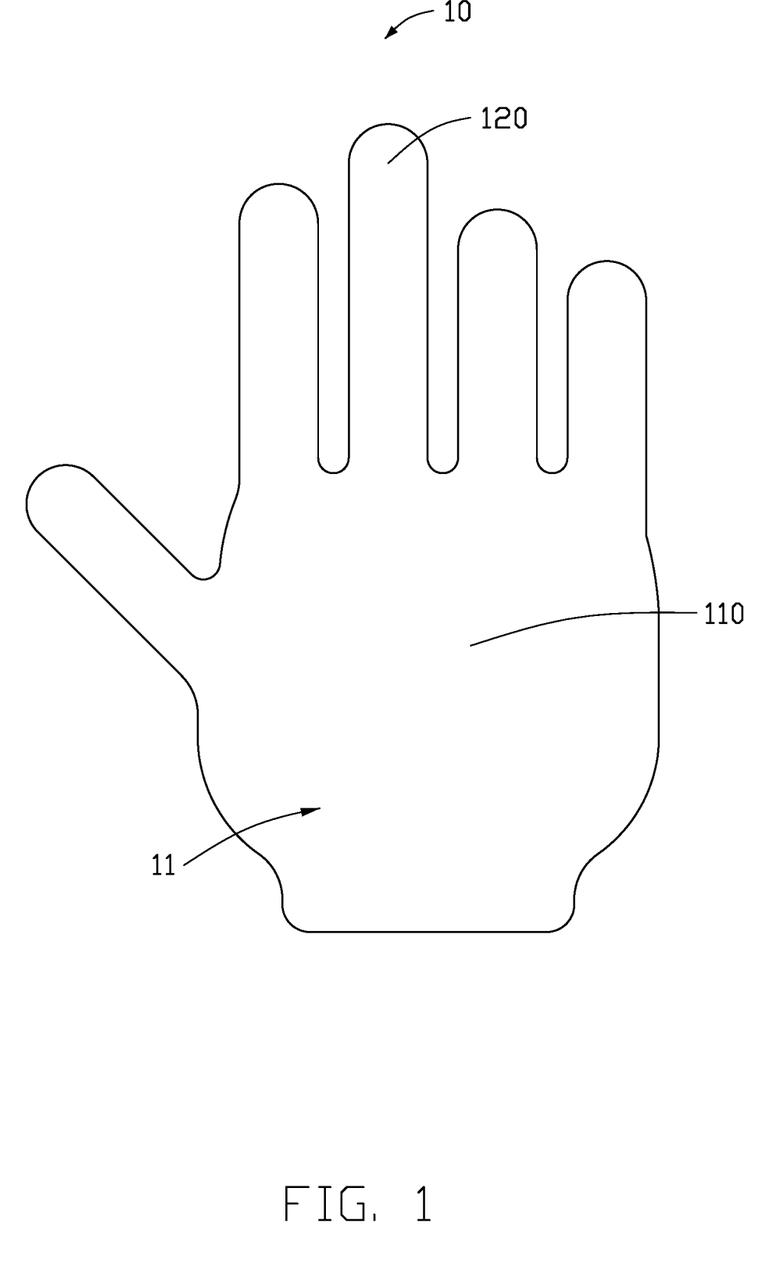
FIG. 1 is a schematic diagram of a glove shaped substrate exposing an inner surface according to an embodiment of the present disclosure.
Figure 2:
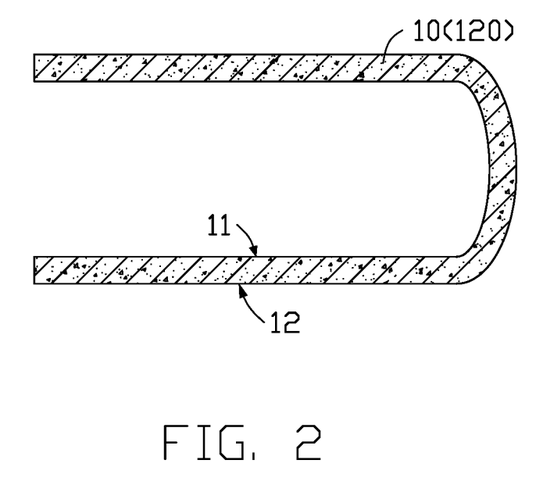
FIG. 2 is a cross-sectional view of a finger area of the glove shaped substrate according to an embodiment of the present disclosure.
Figure 3:
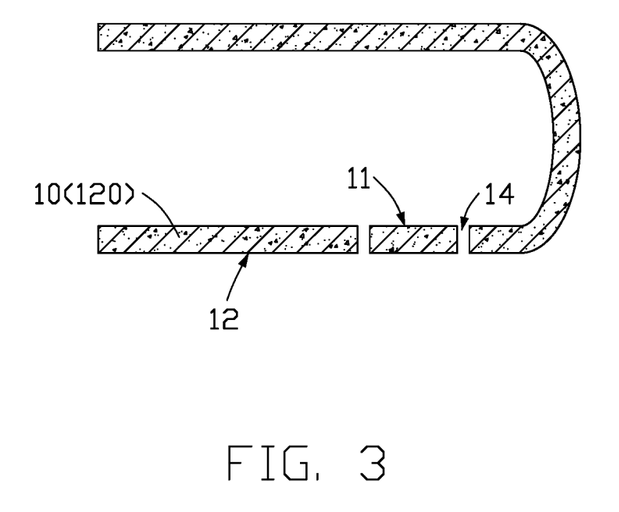
FIG. 3 is a cross-sectional view of a finger area of the glove shaped substrate according to another embodiment of the present disclosure.

Referring to FIGS. 1 to 3, at step S1, a glove shaped substrate 10 is provided.

The glove shaped substrate 10 is flexible. A material of the glove shaped substrate 10 may be selected from a group consisting of thermoplastic polyurethane (TPU), polyimide (PI), polyethylene terephthalate (PET), polyethylene naphthalate (PEN), polyethylene (PE), Teflon, liquid crystal polymer (LCP), polyvinyl chloride polymer (PVC), Ajinomoto Build-up Film (ABF), and combinations thereof.

Figure 16:
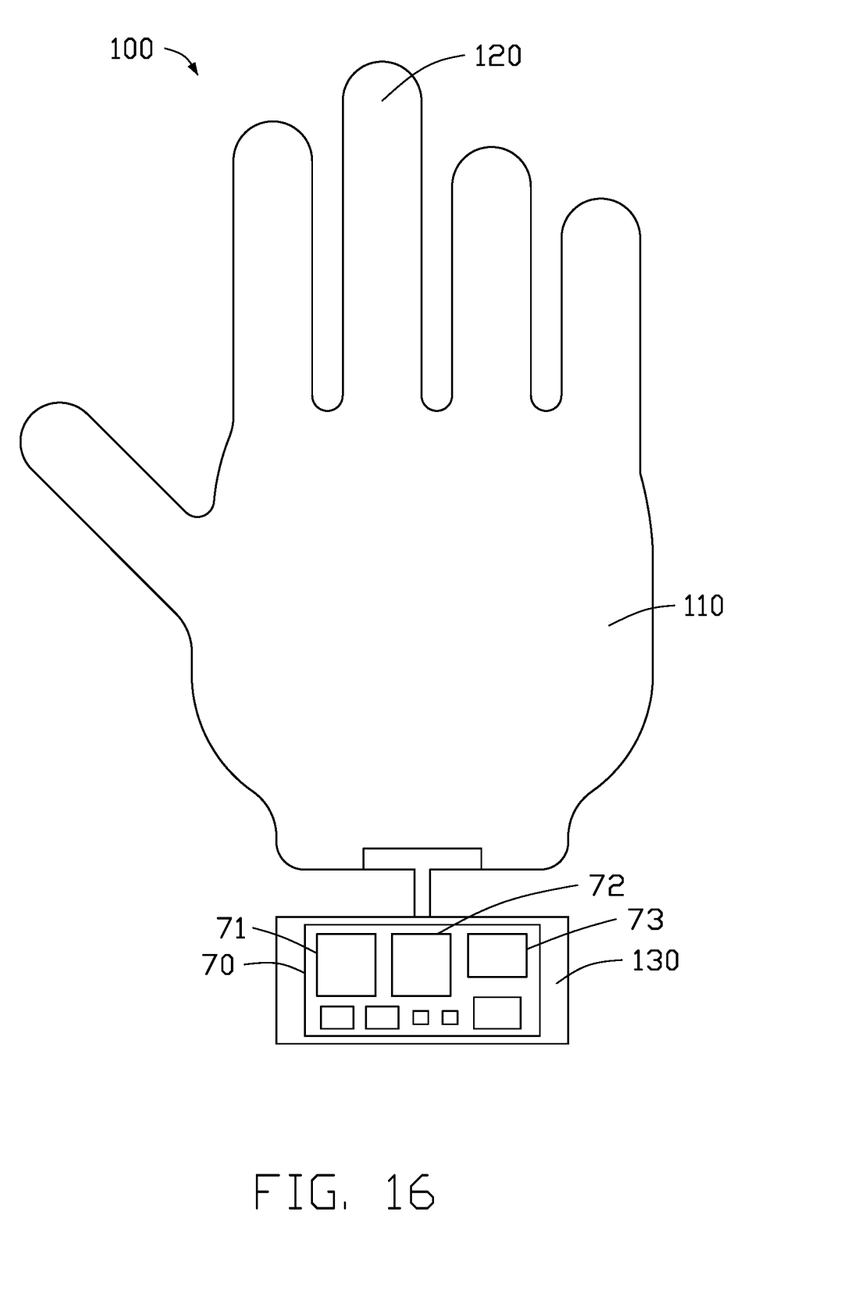
FIG. 16 is a schematic diagram of a virtual reality glove obtained by forming a data processing unit in a wrist area of the glove shaped substrate in a form of a wristband, the data processing unit being connected with the conductive circuits.
Figure 17:
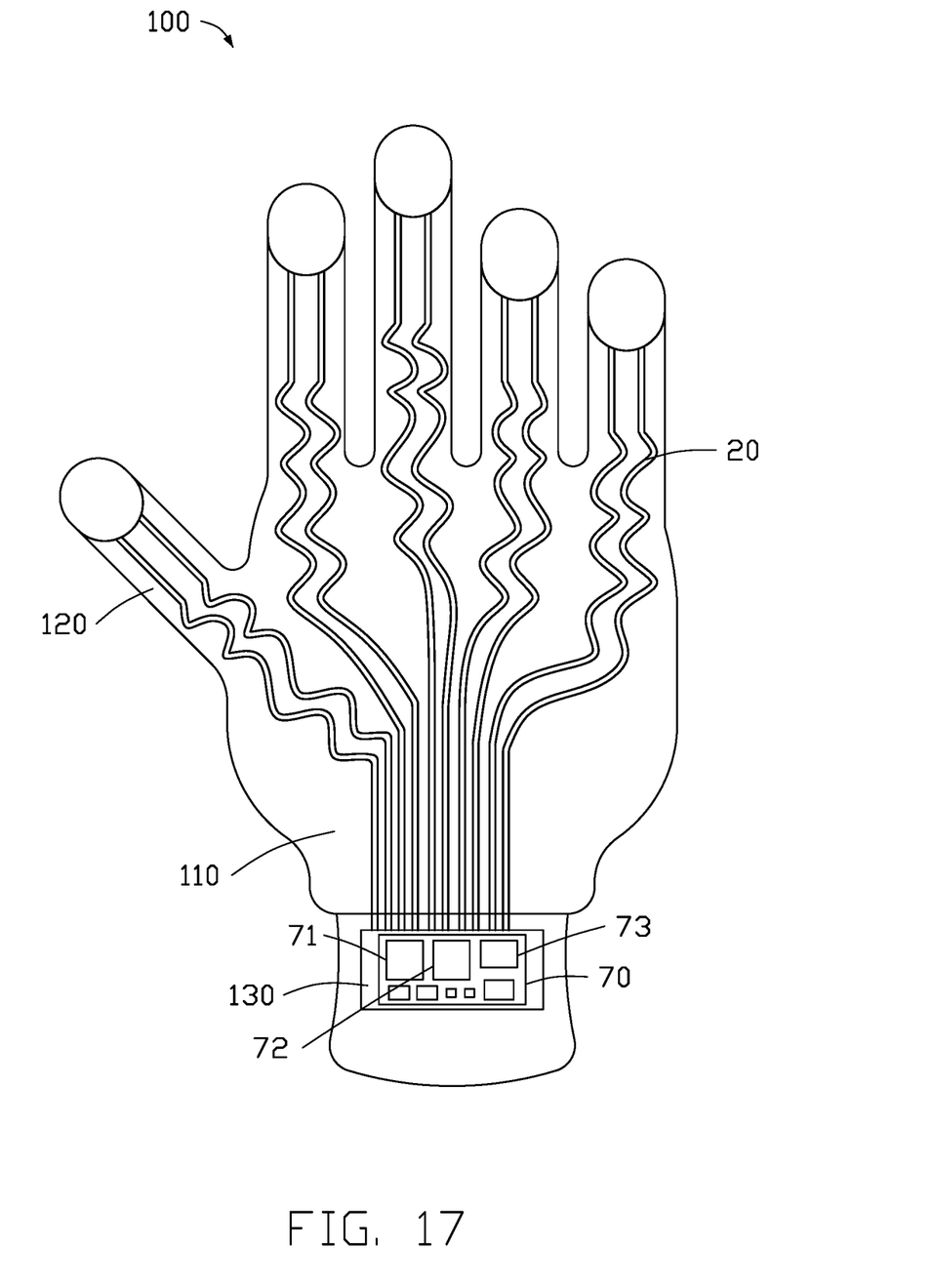
FIG. 17 is a schematic diagram of the virtual reality glove of FIG. 16 exposing the data processing unit and the conductive circuits.

The glove shaped substrate 10 includes a palm area 110, a finger area 120, and a wrist area 130 (shown in FIGS. 16 and 17). The finger area 120 and the wrist area 130 are connected with both ends of the palm area 110 respectively.

The glove shaped substrate 10 also includes an inner surface 11 and an external surface 12 opposite to the inner surface 11. The inner surface 11 makes contact with skin of a user's hand.

Referring to FIG. 3, in one embodiment, the glove shaped substrate 10 further defines at least one through hole 14 which penetrates the inner surface 11 and the external surface 12. In one embodiment, the through hole 14 is defined on the finger area 120 of the glove shaped substrate 10.

Figure 4:
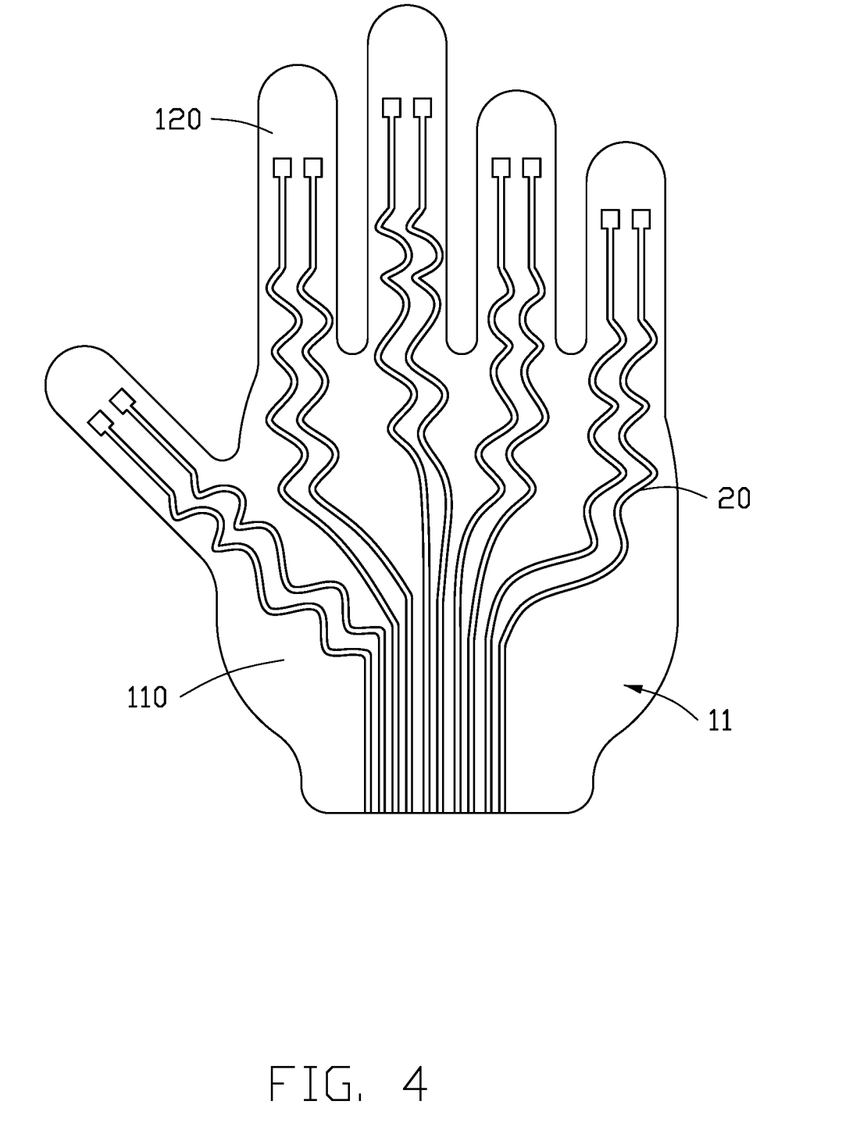
FIG. 4 is a schematic diagram showing conductive circuits formed on the inner surface of the glove shaped substrate of FIG. 1.
Figure 5:
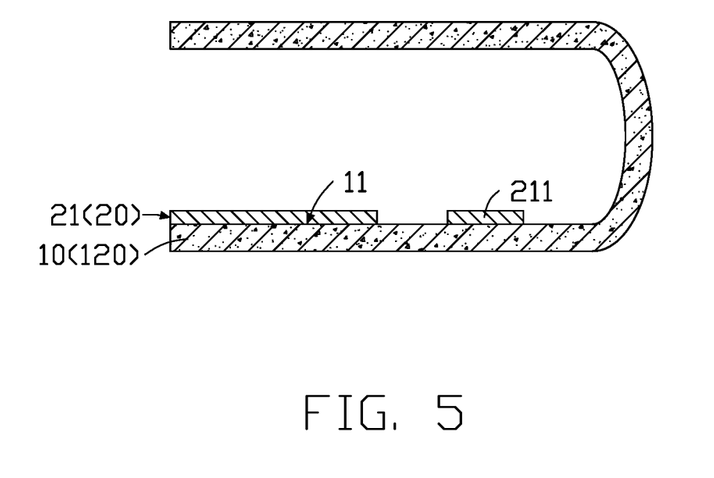
FIG. 5 is a cross-sectional view showing a first conductive layer formed on the finger area of the glove shaped substrate of FIG. 2.
Figure 6:
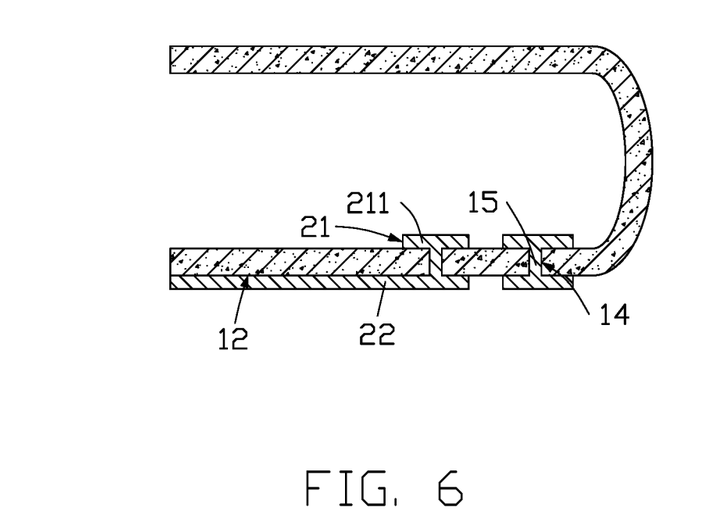
FIG. 6 is a cross-sectional view showing a first conductive layer and a second conductive layer formed on opposite surfaces of the finger area of the glove shaped substrate of FIG. 3.

Referring to FIGS. 4 to 6, at step S2, a plurality of conductive circuits 20 are formed on the glove shaped substrate 10, and each of the plurality of conductive circuits 20 is curved. Each of the plurality of conductive circuits 20 extends from the palm area 110 to the finger area 120. Each of the plurality of conductive circuits 20 includes at least one conductive layer.

In one embodiment, the plurality of conductive circuits 20 are formed by printing.

Referring to FIG. 5, in one embodiment, each of the plurality of conductive circuits 20 includes a first conductive layer 21 which is formed on the inner surface 11 of the glove shaped substrate 10. The first conductive layer 21 includes at least one contact pad 211. In one embodiment, the contact pad 211 is located at the fingertip of the finger area 120. In other embodiments, the contact pad 211 may also be formed at other locations of the palm area 110 and the finger area 120.

Referring to FIG. 6, in another embodiment, each of the plurality of conductive circuits 20 further includes a second conductive layer 22 which is formed on the external surface 12 of the glove shaped substrate 10 and electrically connected with the first conductive layer 21 through a conductive structure 15 formed in the through hole 14. The conductive structure 15 may be a conductive pillar which is formed by filling the through hole 14 with conductive materials. The conductive structure 15 may also be a conductive hole which is formed by electroplating the through hole 14.

In other embodiments, a plurality of additional conductive layers (not shown) may be formed on a surface of the first conductive layer 21 or the second conductive layer 22 to form a conductive circuit 20 having multiple conductive layers.

Figure 7:
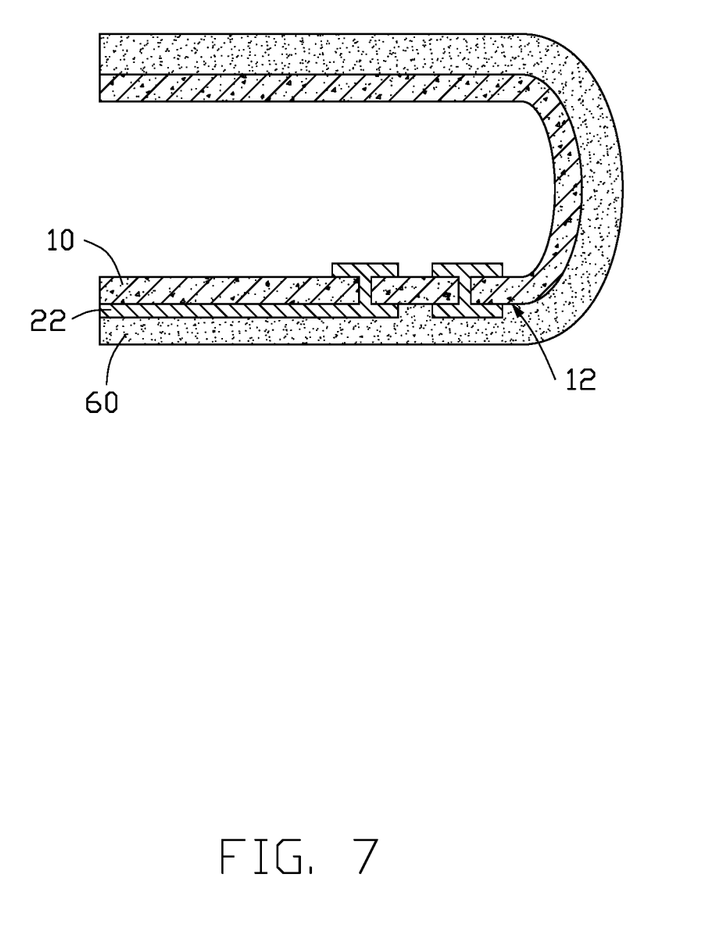
FIG. 7 is a cross-sectional view showing a second protective layer on the second conductive layer and the finger area of the glove shaped substrate of FIG. 6.

Referring to FIG. 7, at step S3, a second protective layer 60 is formed on the second conductive layer 22 and the external surface 12 of the glove shaped substrate 10. The second protective layer 60 is insulating and is used to protect the second conductive layer 22. It is to be understood, when the second conductive layer 22 is omitted, the second protective layer 60 is omitted.

Figure 8:
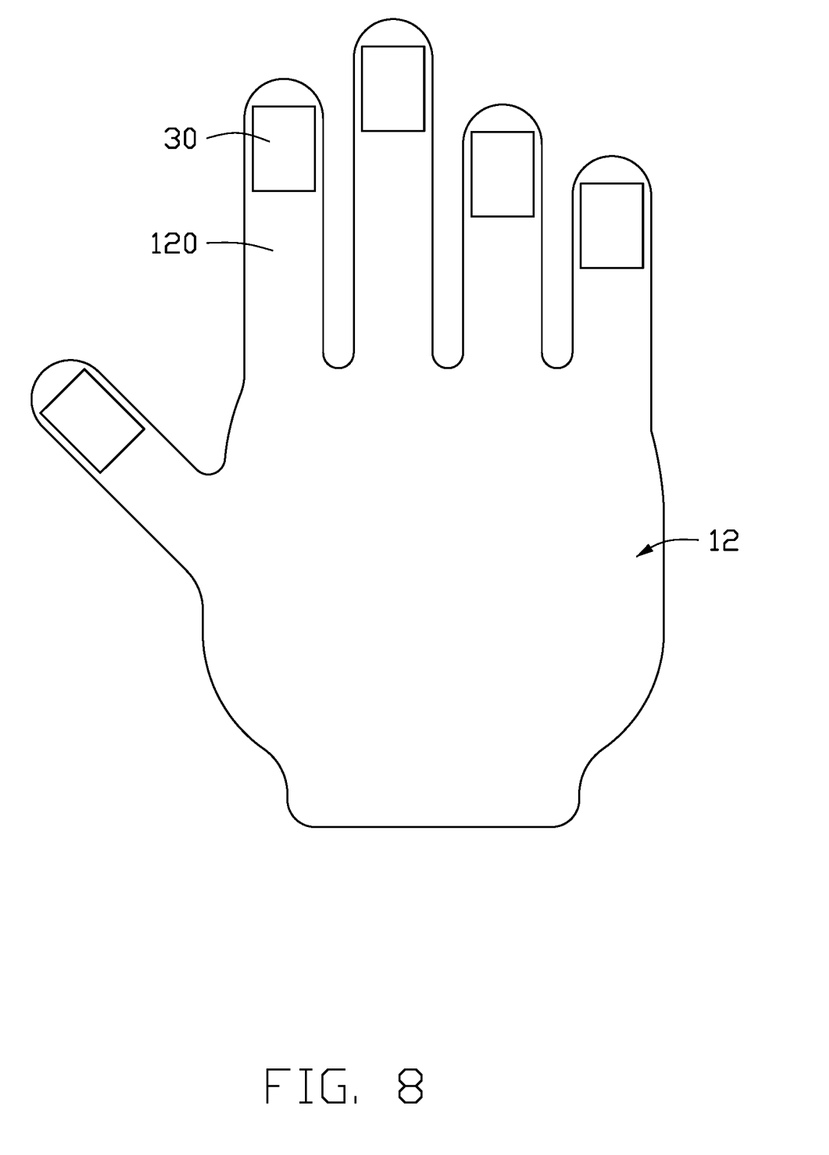
FIG. 8 is a schematic diagram showing reinforcing sheets formed on a back side of the glove shaped substrate of FIG. 4.

Referring to FIG. 8, at step S4, at least one reinforcing sheet 30 is formed on the external surface 12 of the glove shaped substrate 10. The reinforcing sheet 30 corresponds to the position of the contact pad 211, which increases a hardness of a part of the glove shaped substrate 10 corresponding to the contact pad 211, so as to facilitate installation of a tactile feedback unit 40 (shown in FIG. 11).

Figure 9:
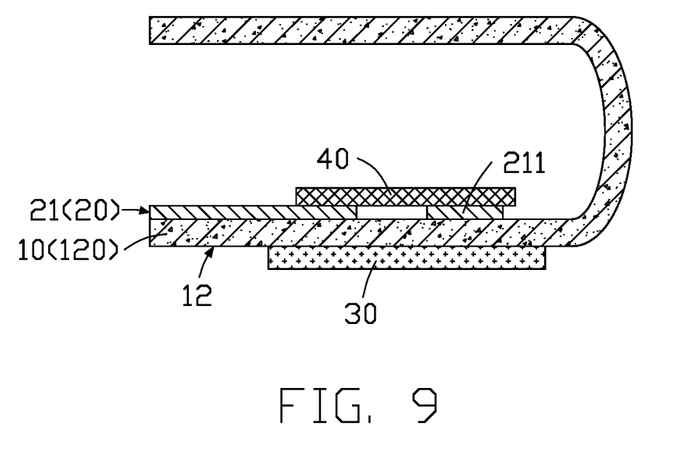
FIG. 9 is a cross-sectional view showing a tactile feedback unit formed on the first conductive layer and a reinforcing sheet formed the back side of the glove shaped substrate of FIG. 5.
Figure 10:
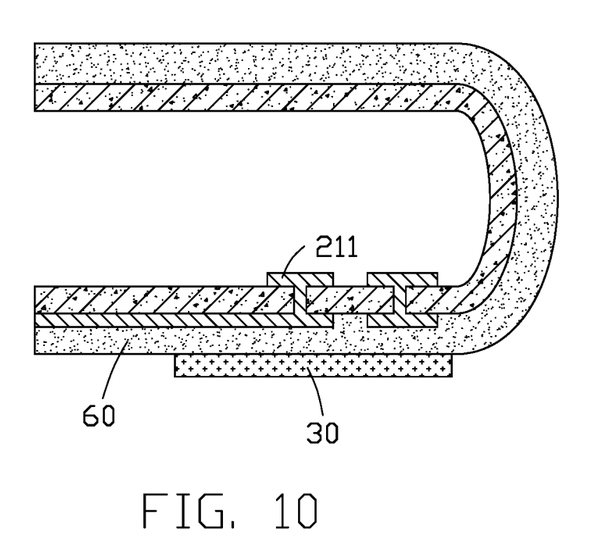
FIG. 10 is a cross-sectional view showing the reinforcing sheet formed on the second protective layer of FIG. 7.

Referring to FIG. 9, in one embodiment, the reinforcing sheet 30 is directly formed on the external surface 12 of the glove shaped substrate 10. Referring to FIG. 10, in another embodiment, the reinforcing sheet 30 is formed on the second protective layer 60 formed on the external surface 12.

Figure 11:
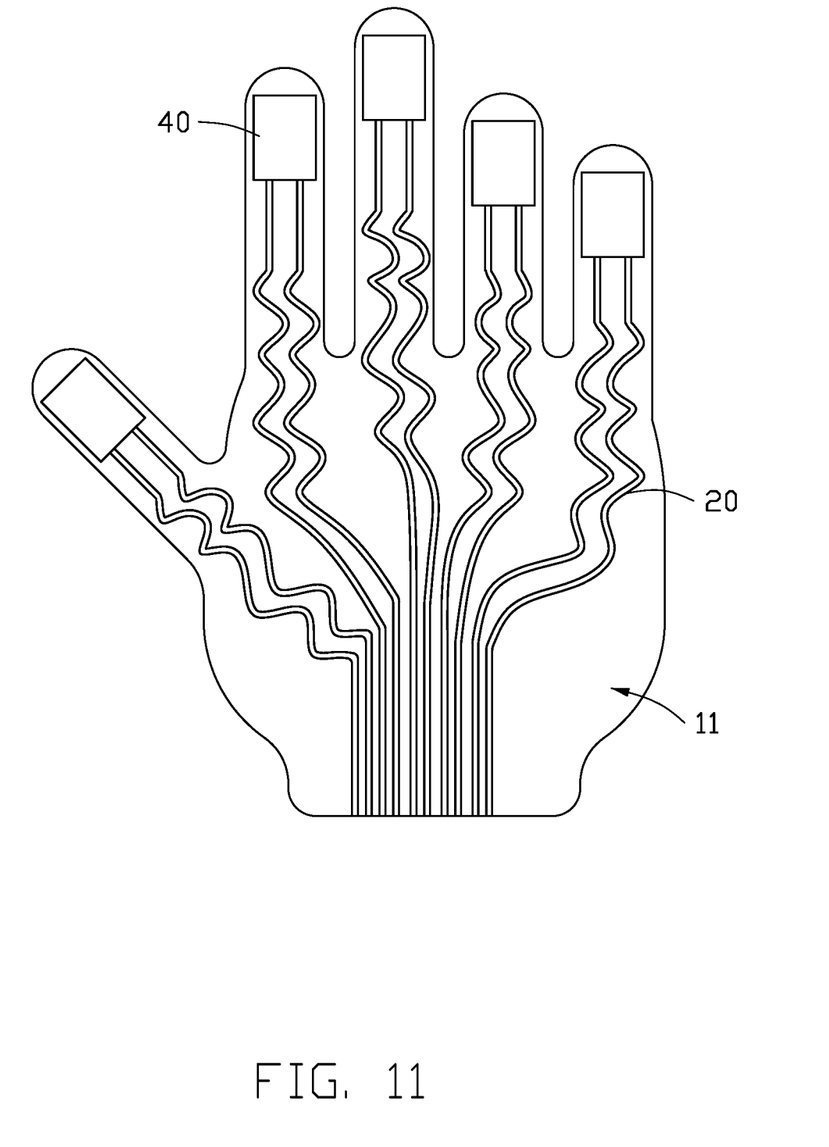
FIG. 11 is a schematic diagram showing tactile feedback units formed on the ends of the conductive circuits of FIG. 8.
Figure 12:
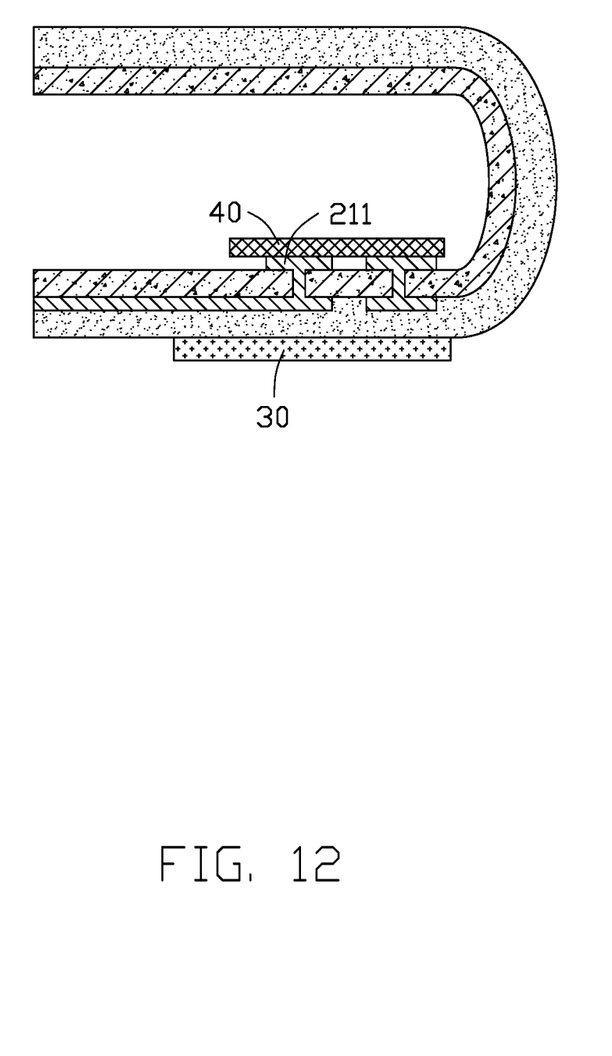
FIG. 12 is a cross-sectional view showing a tactile feedback unit formed on the first conductive layer of FIG. 10.

Referring to FIGS. 9, 11, and 12, at step S5, the tactile feedback unit 40 is formed on the contact pad 211 of one of the conductive circuits 20.

The tactile feedback unit 40 provides tactile feedback information as to a shape, a material, a temperature, a weight, or a texture of a virtual object to a data processing unit 70 (shown in FIG. 16).

Figure 13:
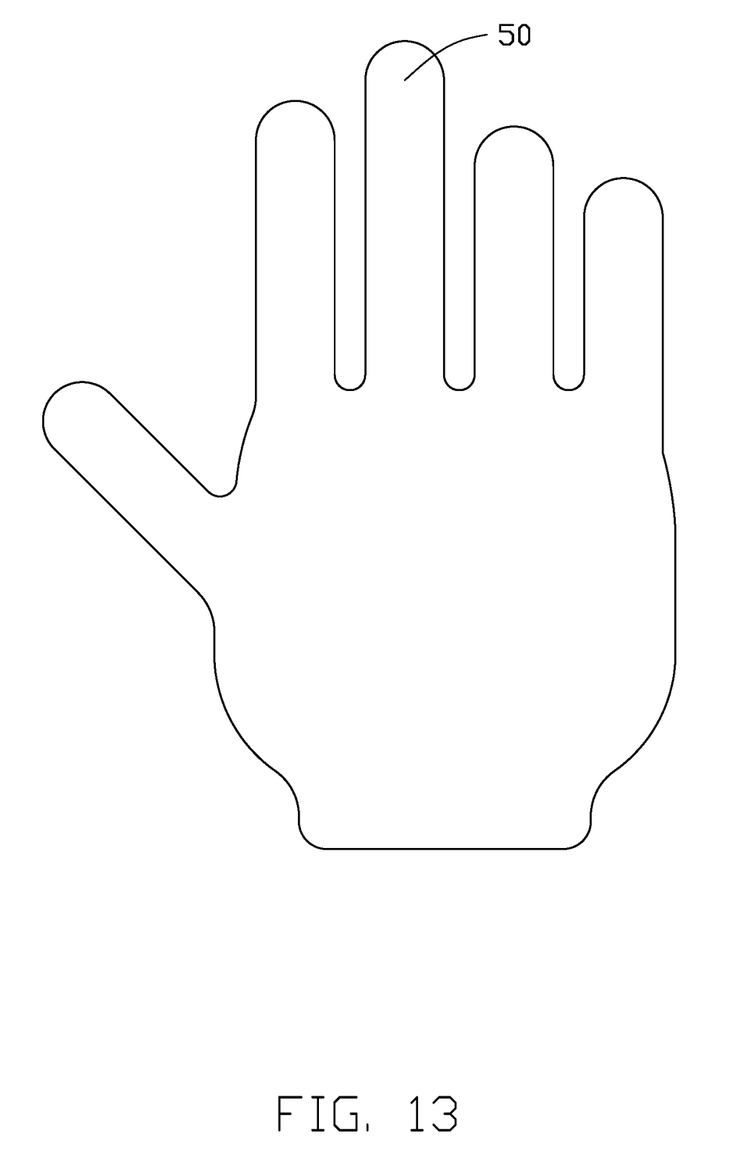
FIG. 13 is a schematic diagram showing a first protective layer formed on the tactile feedback units and the glove shaped substrate of FIG. 11.
Figure 14:
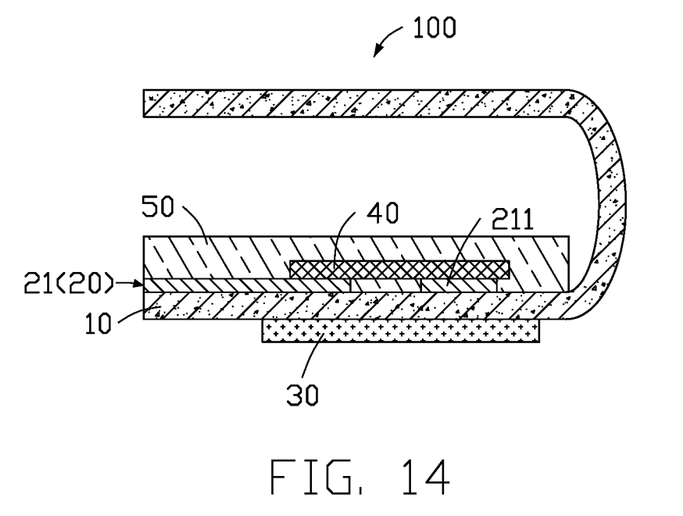
FIG. 14 is a cross-sectional view showing the first protective layer formed on the tactile feedback unit and the glove shaped substrate of FIG. 9.
Figure 15:
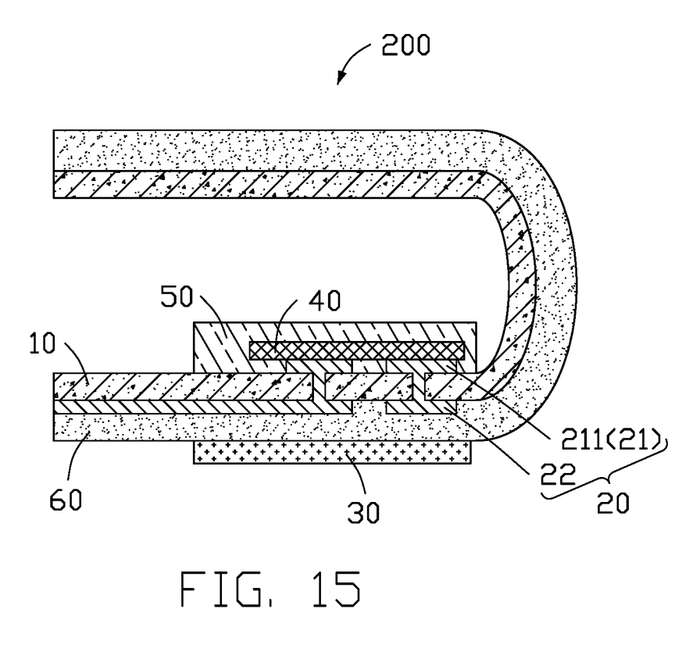
FIG. 15 is a cross-sectional view of a virtual reality glove obtained by forming the first protective layer on the tactile feedback unit and the glove shaped substrate of FIG. 12.

Referring to FIGS. 13 to 15, at step S6, a first protective layer 50 is formed on the inner surface 11 and the tactile feedback unit 40. The first protective layer 50 is insulating. The first protective layer 50 covers all exposed surfaces of the tactile feedback unit 40 and the contact pad 211 and is used to protect the tactile feedback unit 40 and the contact pad 211.

Referring to FIGS. 16 and 17, at step S7, the data processing unit 70 is installed in the wrist area 130 of the glove shaped substrate 10 and is connected with the plurality of conductive circuits 20.

The data processing unit 70 exists independently in the wrist area 130 in a form of a wristband. The data processing unit 70 includes a wireless communication module 71, a controller 72, and a battery 73. The data processing unit 70 receives the tactile feedback information from the tactile feedback unit 40 and controls the corresponding module to give the user the experience of actually feeling the shape, material, temperature, weight, or texture of the virtual object.

Referring to FIGS. 14 to 17, an embodiment of the virtual reality glove 100 is provided. The virtual reality glove 100 enables a physical feeling of the shape, material, temperature, weight, or texture of the virtual object.

The virtual reality glove 100 includes the palm area 110, the finger area 120, and the wrist area 130. The finger area 120 and the wrist area 130 are connected with both ends of the palm area 110 respectively.

The virtual reality glove 100 further includes the glove shaped substrate 10, the plurality of conductive circuits 20 formed on the glove shaped substrate 10, a plurality of tactile feedback units 40, and the data processing unit 70.

The glove shaped substrate 10 is flexible. The material of the glove shaped substrate 10 may be selected from a group consisting of thermoplastic polyurethane (TPU), polyimide (PI), polyethylene terephthalate (PET), polyethylene naphthalate (PEN), polyethylene (PE), Teflon, liquid crystal polymer (LCP), polyvinyl chloride polymer (PVC), Ajinomoto Build-up Film (ABF), and combinations thereof.

The glove shaped substrate 10 includes the inner surface 11 and the external surface 12 opposite to the inner surface 11. The inner surface 11 makes contact with skin of the user's hand.

Each of the plurality of conductive circuits 20 is curved and extends from the palm area 110 to the finger area 120. Each of the plurality of conductive circuits 20 includes at least one conductive layer.

Referring to FIG. 14, in one embodiment, each of the plurality of conductive circuits 20 includes the first conductive layer 21 which is formed on the inner surface 11 of the glove shaped substrate 10. The first conductive layer 21 includes at least one contact pad 211. In one embodiment, the contact pad 211 is located at the fingertip of the finger area 120. In other embodiments, the contact pad 211 may also be formed at other locations of the palm area 110 and the finger area 120.

Referring to FIG. 15, in another embodiment, each of the plurality of conductive circuits 20 further includes the second conductive layer 22 which is formed on the external surface 12 of the glove shaped substrate 10 and electrically connected with the first conductive layer 21 through a conductive structure 15 formed in the through hole 14. The conductive structure 15 may be a conductive pillar which is formed by filling conductive materials into the through hole 14. The conductive structure 15 may also be a conductive hole which is formed by electroplating the through hole 14.

In other embodiments, a plurality of additional conductive layers (not shown) may be formed on a surface of the first conductive layer 21 or the second conductive layer 22 to form a conductive circuit 20 having multiple conductive layers.

The plurality of tactile feedback units 40 are electrically connected with the plurality of conductive circuits 20 respectively. Each of the plurality of tactile feedback units 40 are formed on the contact pad 211 of one of the plurality of conductive circuits 20.

The plurality of conductive circuits 20 are electrically connected with the data processing unit 70. The tactile feedback units 40 provide tactile feedback information as to a shape, a material, a temperature, a weight, or a texture of a virtual object to the data processing unit 70.

The data processing unit 70 exists independently in the wrist area 130 in a form of a wristband. The data processing unit 70 includes the wireless communication module 71, the controller 72, and the battery 73. The data processing unit 70 receives the tactile feedback information from the tactile feedback unit 40 and control the corresponding module to give the user the experience of actually feeling the shape, material, temperature, weight, or texture of the virtual object.

The virtual reality glove 100 further includes a plurality of reinforcing sheets 30 and a first protective layer 50. The reinforcing sheets 30 are disposed on the external surface 12 of the glove shaped substrate 10. Each of the plurality of reinforcing sheets 30 corresponds to the position of the contact pad 211, which increases a hardness of a part of the glove shaped substrate 10 corresponding in position to the contact pad 211, so as to facilitate installation of the tactile feedback units 40.

Referring to FIG. 14, in one embodiment, the reinforcing sheet 30 is directly formed on the external surface 12 of the glove shaped substrate 10.

The first protective layer 50 is formed on the inner surface 11 and the tactile feedback units 40. The first protective layer 50 is insulating. The first protective layer 50 covers all exposed surfaces of the tactile feedback units 40 and the contact pad 211 and is used to protect the tactile feedback units 40 and the contact pad 211.

Referring to FIG. 6, in another embodiment, each of the plurality of conductive circuits 20 further includes the second conductive layer 22, and the virtual reality glove 100 further includes the second protective layer 60 formed on the external surface 12 and the second conductive layer 22. In this case, the reinforcing sheet 30 is formed on the second protective layer and is used to protect the second conductive layer 22.

In the present disclosure, the conductive circuits 20 are directly formed on the glove shaped substrate 10, and the data processing unit 70 existing independently in the form of a wristband is integrated in the wrist area 130, thus the virtual reality glove 100 is thin and light. In addition, the glove shaped substrate 10 is flexible, and the conductive circuits 20 are curved, so that the virtual reality glove 100 is flexible and the conductive circuits 20 will not be fractured or damaged when the virtual reality glove 100 is stretched, so as to facilitate free movement of the user's hand.

The above is only a preferred embodiment of the present disclosure, and is not intended to limit the scope of the present disclosure. Although embodiments of the present disclosure are described above, it is not intended to limit the present disclosure. The present disclosure may be modified or modified to equivalent variations without departing from the technical scope of the present disclosure by any person skilled in the art. Any simple modifications, equivalent changes and modifications made to the above embodiments remain within the scope of the technical solutions of the present disclosure.

What is claimed is:

1. A virtual reality glove comprising:
    a glove shaped substrate comprising a palm area and a finger area connected with the palm area, the glove shaped substrate being flexible;
    a plurality of conductive circuits disposed on the glove shaped substrate, the plurality of conductive circuits being curved, wherein the glove shaped substrate further comprises an inner surface and an external surface, each of the plurality of conductive circuits comprises a first conductive layer formed on the inner surface;
    a plurality of tactile feedback units disposed on and electrically connected with the plurality of conductive circuits respectively, wherein each of the plurality of tactile feedback units is formed on and electrically connected with the first conductive layer of one of the plurality of conductive circuits;
    a first protective layer disposed on the inner surface, wherein the protective layer covers the first conductive layer and the plurality of tactile feedback units;
    a plurality of reinforcing sheets disposed on the external surface, wherein the plurality of reinforcing sheets correspond to the plurality of tactile feedback units respectively; and
    a data processing unit installed on an end of the palm area away from the finger area and electrically connected with the plurality of conductive circuits.

2. The virtual reality glove of claim 1, wherein the data processing unit is wristband shaped.

3. The virtual reality glove of claim 2, wherein the data processing unit comprises a wireless communication module, a controller, and a battery.

4. The virtual reality glove of claim 1, wherein each of the plurality of conductive circuits extends from the palm area to the finger area.

5. The virtual reality glove of claim 4, wherein the plurality of tactile feedback units are located in the finger area.

6. The virtual reality glove of claim 5, wherein the plurality of tactile feedback units are disposed on ends of the plurality of conductive circuits.

7. The virtual reality glove of claim 1, wherein each of the plurality of conductive circuits further comprises a second conductive layer disposed on the external surface, the second conductive layer is electrically connected with the first conductive layer through a conductive structure penetrating the inner surface and the external surface.

8. The virtual reality glove of claim 7, further comprising a second protective layer covering the second conductive layer, wherein the plurality of reinforcing sheets are disposed on a surface of the second protective layer away from the second conductive layer.

9. A method for manufacturing a virtual reality glove comprising:
    providing a glove shaped substrate comprising a palm area and finger area connected with the palm area, the glove shaped substrate being flexible;
    forming a plurality of conductive circuits on the glove shaped substrate, the plurality of conductive circuits being curved, wherein the glove shaped substrate further comprises an inner surface and an external surface, each of the plurality of conductive circuits comprises a first conductive layer formed on the inner surface;

forming a plurality of tactile feedback units on the plurality of conductive circuits respectively, the plurality of tactile feedback units being electrically connected with the plurality of conductive circuits respectively, wherein each of the plurality of tactile feedback units is formed on and electrically connected with the first conductive layer of one of the plurality of conductive circuits;

forming a first protective layer on the inner surface, wherein the protective layer covers the first conductive layer and the plurality of tactile feedback units;

forming a plurality of reinforcing sheets on the external surface, wherein the plurality of reinforcing sheets correspond to the plurality of tactile feedback units respectively; and installing a data processing unit on an end of the palm area away from the finger area and electrically connecting the data processing unit to the plurality of conductive circuits.

10. The method of claim 9, wherein the data processing unit is wristband shaped.

11. The method of claim 10, wherein the data processing unit comprises a wireless communication module, a controller, and a battery.

12. The method of claim 9, wherein each of the plurality of conductive circuits extends from the palm area to the finger area.

13. The method of claim 12, wherein the plurality of tactile feedback units are located in the finger area.

14. The method of claim 13, wherein the plurality of tactile feedback units are formed on ends of the plurality of conductive circuits.

15. The method of claim 9, wherein each of the plurality of conductive circuits further comprises a second conductive layer disposed on the external surface, the second conductive layer is electrically connected with the first conductive layer through a conductive structure penetrating the inner surface and the external surface.

16. The method of claim 15, further comprising forming a second protective layer on the second conductive layer, wherein the plurality of reinforcing sheets are formed on a surface of the second protective layer away from the second conductive layer.

* * * * *